May 30, 1967     J. E. GETZ     3,322,345

TEMPERATURE REGULATED FLOW CONTROL VALVE

Filed Feb. 15, 1965

INVENTOR
JOHN E. GETZ
BY Beaman & Beaman
ATTORNEYS 3,322,345
TEMPERATURE REGULATED FLOW
CONTROL VALVE
John E. Getz, Jackson, Mich., assignor to Sparton Corporation, Jackson, Mich., a corporation of Ohio
Filed Feb. 15, 1965, Ser. No. 432,534
2 Claims. (Cl. 236—93)

The invention pertains to a fluid flow control valve and particularly relates to a temperature regulated flow control valve which is capable of very accurate flow regulation.

While many thermally controlled valve devices have been produced wherein the flow through the valve is controlled by the temperature of the valve, or the fluid flowing therethrough, known devices are relatively large and cumbersome and subject to inaccuracies and malfunctions which often result from the mechanical linkages interconnecting the temperature responsive member with the valve components. Also, know thermally controlled and regulated valves are usually of a rather complex and sensitive nature and valves constructed in accord with conventional practice which are capable of very accurately controlling fluid flow in response to temperature variations are expensive to manufacture and purchase.

A basic object of the invention is to provide a temperature regulated flow control valve which may be incorporated into a fluid system wherein a minimum of mechanism is required to regulate the flow through the system in response to the temperature of the valve, or the fluid.

Another object of the invention is to provide a temperature regulated flow control valve which is relatively inexpensive and which is capable of producing accurate fluid flow control in response to thermal conditions for long periods of time with a minimum of maintenance.

An additional object of the invention is to provide a temperature regulated flow control valve utilizing an elastomer having a high coefficient of expansion and wherein the elastomer directly functions as a valve element for cooperation with seating means.

An additional object of the invention is to utilize the unique characteristics of a silicone elastomer in a thermally regulated flow control valve wherein the elastomer directly functions as the valve element and wherein adjusting means are provided to regulate the operating characteristics of the valve.

Figure 1:
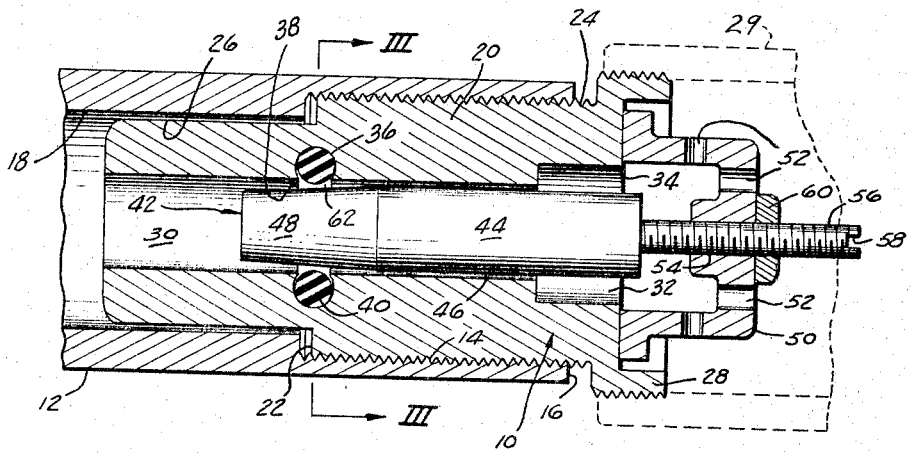
Figure 2:
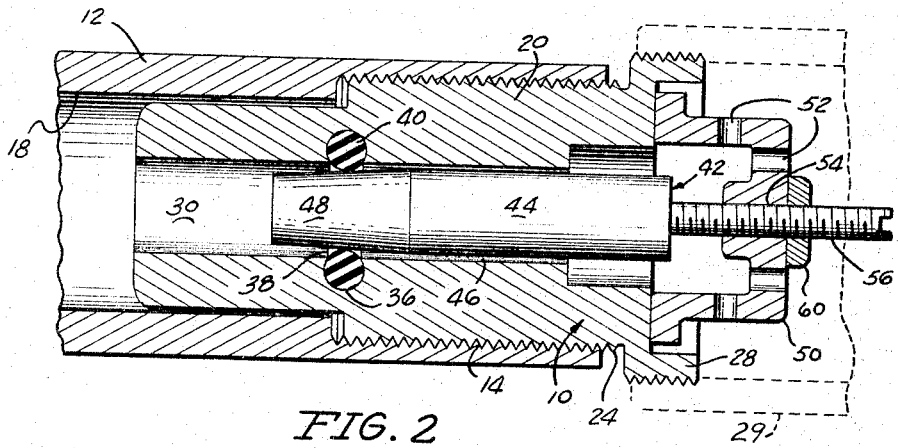
Figure 3:
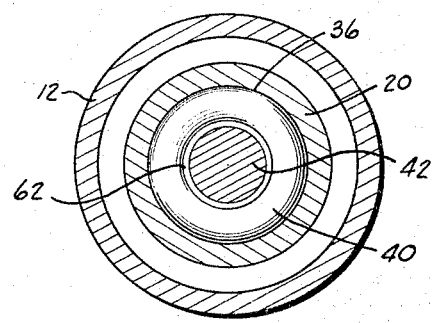

These and other objects of the invention arising from the details and the relationships of the components of an embodiment thereof will be apparent from the following descriptions and accompanying drawings wherein:

FIG. 1 is a diametrical, elevational view of a temperature regulated flow control valve in accord with the invention as installed in a conduit, and illustrating the elastomer valve element in a contracted or "open" relationship, FIG. 2 is a diametrical, elevational, sectional view similar to FIG. 1, illustrating the elastomer valve element in the fully expanded or "closed" position, and FIG. 3 is an elevational, sectional view taken along section III—III of FIG. 1, In the drawing a valve employing the concepts of the invention is generally indicated at 10, and is illustrated as being located within a cylindrical conduit 12. The conduit 12 may be internally threaded at 14 adjacent the conduit end 16 and includes a bore 18 which may communicate with additional passages or conduits of the associated fluid system.

The valve 10 includes a cylindrical body 20 having an enlarged portion 22 externally threaded at 24 as to mate with the threads 14 of the conduit. The body portion 26 is of a reduced diameter adapted to fit within the conduit bore 18. If desired, any conventional connecting means may be employed to sealingly affix the body 20 to an additional conduit wherein the valve may be enclosed within conduits. To this end, an annularly enlarged, threaded portion 28, for instance, may be defined upon the body 20 for cooperation with the internal threads of a conduit 29, shown in dotted lines. If desired, it would also be possible to permit a greater axial portion of the body portion 22 to extend beyond the conduit end 16 than that shown and form threads on this extending body portion to permit another conduit similar to the conduit 12 to be threaded upon the body 20. If it is desired that air, or the fluid surrounding the exterior of the conduit 12 and valve 10 is to be introduced into the conduit 12, or if the fluid within the conduit 12 is to be expelled directly into the atmosphere surrounding the conduit, no additional conduit need be associated with the valve body 20.

An axial cylindrical bore or passage 30 is defined through the body 20. If desired, the bore 30 may be enlarged at 32 adjacent the body outer end 34. The other end of the bore intersects the inner body end whereby a passage completely through the valve body is provided.

In the central region of the body 20 an annular recess 36 is defined therein which is concentric with the body bore 30. The recess 36 has a cross-sectional configuration which is preferably circular, although other configurations may be employed. The recess 36 is so related to the bore 30 that the recess intersects the bore in a circumferential manner providing an annular slot 38 about the bore which establishes communication between the bore and the recess. As will be apparent from FIG. 1, the width of the slot 38 in the axial direction of the bore is less than the maximum transverse cross-sectional dimension of the recess.

The valve element consists of an annular ring 40 which is received within the recess 36. The ring 40 is preferably formed of an elastomer and, in particular, a silicone elastomer having a high coefficient of expansion. The normal cross-sectional size and configuration of the elastomer ring 40 is such that at the cooler temperatures to which the valve body, and ring, will be subjected, the ring will contract to a dimensional relationship relative to the recess 36, as shown in FIG. 1. Thus, at the cooler operating temperatures, the inner diameter of the ring 40 will project only slightly, if at all, through the slot 38 and into the valve bore 30. When the valve and ring are at the higher operating temperatures, the ring material will expand and completely fill the recess 36, and substantially, radially project into the bore 30, in an annular manner, through the slot 38, as shown in FIG. 2.

To permit the valve ring 40 to control fluid flow through the bore 30, valve seating means in the form of a projection 42 is located within the bore. The projection 42 preferably consists of a body having a cylindrical portion 44 of a diameter substantially less than the diameter of the body bore 30, whereby an annular passage 46 is defined through the bore 30 intermediate the projection portion 44 and the bore 30. The inner end of the projection 42 is formed with a conical surface 48 which is adapted to be axially aligned with the valve ring 40.

The projection 42 is adapted to be adjustably positioned within the bore 30 to permit regulation of the valve operating characteristics. The projection positioning means includes a spider 50 affixed to the outer end 34 of the valve body. The spider includes a plurality of holes 52 defined therein for permitting fluid flow through the spider, and a threaded bore 54 is defined in the spider in concentric alignment with the axis of the bore 30.

A threaded shaft 56 extends from the outer end of the projection 42 and matingly engages the threads within the spider bore 54. A slot 58 may be defined in the end of the threaded shaft to facilitate the rotation of the threaded shaft and, thereby, axially position the projecion 42 within the bore 30, as desired. A lock nut 60 may be threaded upon the shaft 56 to abut the spider and lock the projection at the desired axial position.

Due to the conical surface 48 defined upon the projection 42, axial adjustment of the projection within the bore 30 will vary the radial distance between the recess slot 38 and the portion of the conical surface 48 axially aligned therewith. In this manner, the relationship between the valve ring 40 and the projection 42 may be adjusted to produce the desired flow rate at a predetermine temperature.

In operation, the lock nut 60 would be backed off from the spider 50, and the threaded shaft 56 and the projection 42 would be rotated to axially position the conical surface 48 of the projection relative to the elastomer ring 40, and slot 38, to produce the desired rate of flow for the particular application and at predetermined temperatures. Retightening the lock nut 60 will axially secure the projection 42 within the bore 30. Assuming the temperature of the fluid flowing through the bore 30 to be relatively "cool," with regard to the operating temperature range, the elastomer material of the ring 40 will be at a "contracted" condition such as that represented in FIG. 1. Under such temperature conditions, an annular gap 62, FIGS. 1 and 3, exists between the inner diameter of the ring 40 and the conical surface 48, whereby fluid flow may occur through the valve body bore 30. If the temperature of the fluid flowing through the bore 30, or the temperature of the environment about the valve body decreases, the elastomer ring material will further contract, increasing the radial dimension of the annular gap 62 between the ring and the projection to increase the amount of the fluid flow through the valve bore.

If the temperature of the ring 40 increases, due to an increase in the temperature of the fluid flowing through the valve, or an increase in temperature of the environment about the valve, the ring material will expand to completely fill the annular recess 36 and project, in an annular manner, further into the bore 30 toward the projection conical surface 48. This expansion of the ring material reduces the radial dimension of the annular gap 62 between the ring and projection and restricts the fluid flow through the valve body. The projection 42 will be positioned relative to the elastomer ring 40 so that the ring material will engage the projection conical surface 48, as shown in FIG. 2, to completely shut off the flow of fluid through the valve body bore 30, when the maximum temperature conditions desired are reached. Upon the elastomer ring material cooling from the maximum operating temperature, a gap 62 will once again exist between the ring and the projection and permit fluid flow through the body bore.

In that the elastomer material has the characteristic of exerting equal pressure on all sides of the recess as it expands, and as silicone elastomers are self-supporting and have a finite shear strength, their use in the invention produces very acceptable results. The high coefficient of expansion of silicone elastomers makes the valve very sensitive to temperature variations and the general characteristics of the silicone elastomers make their use with this type of control valve most desirable. As the ring material, itself, functions as the valve element, the likelihood of malfunctioning is substantially reduced over known constructions employing linkages between the valve element and the thermally responsive element, and the simplicity and reduction of the number of components required in the thermostatic valve of the invention, as compared to conventional thermostatic valve constructions, will be readily appreciated.

The particular composition of the ring material will vary somewhat in accordance with the particular operating temperatures and characteristics desired. However, by way of example, in a commercial embodiment of the invention, a general purpose silicone rubber manufactured by the F. B. Wright Company of Detroit, Mich., of the AMS 3302 type was employed.

It is appreciated that various modifications to the invention may be apparent to those skilled in the art without departing from the spirit and scope thereof and it is intended that the invention be defined only by the scope of the following claims:

I claim:

1. Temperature regulated fluid flow control apparatus comprising, in combination;
  (a) a body,
  (b) a fluid passage defined in said body,
    said passage having a cylindrical wall portion,
  (c) an annular recess defined in said body circumscribing and intersecting said passage,
    said recess having a substantially circular transverse cross section in axial alignment with and annularly intersecting said passage cylindrical wall portion to define a slot therein,
  (d) a thermally expandable and contractible annular control element closely received within said recess and adapted to extend into said passage, the extended distance of said control element being a function of control element temperature,
    said annular control element being of circular transverse cross section, and
  (e) a projection located within said passage concentric to said cylindrical wall portion and in axial alignment with said recess,
    said projection having a circular cross section portion,
      said circular cross section portion having a conical surface adapted to cooperate with said annular control element to define a fluid flow regulating constriction.

2. In a temperature regulated fluid flow control apparatus, as defined by claim 1, wherein;
  (a) said slot is of lesser dimension in the axial direction of said cylindrical wall portion than the maximum transverse cross sectional diameter of said recess, and
  (b) said slot is of uniform radial depth.

References Cited

UNITED STATES PATENTS

| | | | |
|---|---|---|---|
| 2,083,584 | 6/1937 | Wineman | 137—539 X |
| 2,319,498 | 5/1943 | Gerard | 236—93 |
| 2,690,360 | 9/1954 | Young | 308—36.1 |
| 2,902,222 | 9/1959 | Noakes | 236—93 |
| 2,980,392 | 4/1961 | Greenwood | 251—210 |
| 3,071,344 | 1/1963 | Banks | 251—333 X |
| 3,212,337 | 10/1965 | McCarrick | 236—100 X |

OTHER REFERENCES

Brenner et al.: High-Temperature Plastics, Reinhold Publishing Corps., N.Y.C., 1962, pages 112, 113, 114, 175 and 176.

Marks: Mechanical Engineers Handbook McGraw-Hill, New York, 1930, page 305.

ALDEN D. STEWART, *Primary Examiner.*